United States Patent
Bogan et al.

(10) Patent No.: US 9,305,235 B1
(45) Date of Patent: Apr. 5, 2016

(54) SYSTEM AND METHOD FOR IDENTIFYING AND LOCATING INSTANCES OF A SHAPE UNDER LARGE VARIATIONS IN LINEAR DEGREES OF FREEDOM AND/OR STROKE WIDTHS

(75) Inventors: Nathaniel Rockwood Bogan, Natick, MA (US); Toshimitsu Motoyama, Newton, MA (US)

(73) Assignee: COGNEX CORPORATION, Natick, MA (US)

( * ) Notice: Subject to any disclaimer, the term of this patent is extended or adjusted under 35 U.S.C. 154(b) by 1651 days.

(21) Appl. No.: 12/004,527

(22) Filed: Dec. 21, 2007

(51) Int. Cl.
*G06K 9/46* (2006.01)
*G06T 7/00* (2006.01)

(52) U.S. Cl.
CPC ............ *G06K 9/4604* (2013.01); *G06T 7/0042* (2013.01)

(58) Field of Classification Search
CPC ..... G06K 9/48; G06K 9/6204; G06K 9/4604; G06K 9/44; G06K 9/6211; G06T 2207/20044; G06T 7/0081; G06T 7/0028; G06T 7/0046; G06T 7/0083; G06T 7/0004; G06T 7/0026; G06T 9/20; G06T 7/0042; G06T 7/0085; G06F 17/30259; G06F 17/3079; G03F 9/7088; G03F 9/7076; G03F 1/84; H05K 1/0266
USPC ........ 382/167, 141, 147, 151, 152, 159, 175, 382/190, 199, 209, 259
See application file for complete search history.

(56) References Cited

U.S. PATENT DOCUMENTS

| | | | |
|---|---|---|---|
| 4,704,694 A * | 11/1987 | Czerniejewski | 382/288 |
| 5,515,455 A * | 5/1996 | Govindaraju et al. | 382/186 |
| 5,761,326 A | 6/1998 | Brady et al. | |
| 5,970,170 A * | 10/1999 | Kadashevich et al. | 382/187 |
| 6,130,667 A * | 10/2000 | Hasegawa et al. | 345/467 |
| 6,377,710 B1 * | 4/2002 | Saund | 382/258 |
| 6,424,746 B1 * | 7/2002 | Nishida | G06K 9/6204 382/195 |
| 6,639,624 B1 | 10/2003 | Bachelder et al. | |
| 6,751,338 B1 | 6/2004 | Wallack | |
| 6,771,808 B1 | 8/2004 | Wallack | |

(Continued)

OTHER PUBLICATIONS

Kraut, et al., "Comparison of Functional MR and $H_2^{15}O$ Positron Emission Tomography in Stimulation of the Primary Visual Cortex", AJNR Am J Neuroradiol 16:2101-2107, Nov. 1995, American Society of Neuroradiology, pp. 2101-2107.

Fischler, et al., "Random Sample Consensus: A Paradigm for Model Fitting with Applications to Image Analysis and Automated Cartography", Communications of the ACM, Jun. 1981, vol. 24, No. 6, pp. 381-395.

(Continued)

*Primary Examiner* — Kim Vu
*Assistant Examiner* — Michael Vanchy, Jr.
(74) *Attorney, Agent, or Firm* — Quarles & Brady LLP

(57) ABSTRACT

A system and method for identifying and locating instances of a shape under large variations in linear degrees of freedom is provided. The invention extracts boundary segments from an image and generates potential match candidates for boundary models based on the extracted boundary segments. The invention also extracts skeletal segments from the obtained image. Potential match candidates are then generated for skeletal models based on the extracted skeletal segments. Once the match candidates for the boundary models and skeletal models have been generated, the present invention then corresponds the various boundary segments and outputs a best correspondence. The output from the present invention may be utilized by a user to signify acceptance of the various correspondences located by the present invention. These correspondences may then be utilized to train a machine vision system.

16 Claims, 9 Drawing Sheets

(56) References Cited

U.S. PATENT DOCUMENTS

| | | |
|---|---|---|
| 6,901,236 B2 | 5/2005 | Saitoh et al. |
| 7,006,669 B1 | 2/2006 | Lavagnino et al. |
| 7,068,817 B2 | 6/2006 | Bourg, Jr. et al. |
| 7,119,351 B2 | 10/2006 | Woelki |
| 7,260,813 B2 | 8/2007 | Du et al. |
| 2001/0033694 A1* | 10/2001 | Goodman et al. ............ 382/229 |
| 2002/0181780 A1* | 12/2002 | Simon et al. ................. 382/209 |
| 2005/0271279 A1* | 12/2005 | Fujimura et al. ............. 382/203 |
| 2005/0283752 A1* | 12/2005 | Fruchter et al. ............... 717/100 |
| 2008/0079729 A1* | 4/2008 | Brailovsky ........... G06K 9/6211 345/443 |

OTHER PUBLICATIONS

Roerdink, et al., "The Watershed Transform: Definitions, Algorithms and Parallelization Stategies", Fundamenta Informaticae 41, 2001, pp. 187-228.

* cited by examiner

SYSTEM AND METHOD FOR IDENTIFYING AND LOCATING INSTANCES OF A SHAPE UNDER LARGE VARIATIONS IN LINEAR DEGREES OF FREEDOM AND/OR STROKE WIDTHS

BACKGROUND OF THE INVENTION

1. Field of the Invention

The present invention relates to machine vision systems and, more specifically, to identifying and locating instances of a shape under large variations in linear degrees of freedom and/or stroke widths in machine vision systems.

2. Background Information

The use of advanced machine vision systems and their underlying software is increasingly employed in a variety of manufacturing and quality control processes. Machine vision enables quicker, more accurate and repeatable results to be obtained in the production of both mass-produced and custom products. Basic machine vision systems include one or more cameras (typically having solid-state charge couple device (CCD) imaging elements) directed at an area of interest, frame grabber/image processing elements that capture and transmit CCD images, a computer and display for running the machine vision software application and manipulating the captured images, and appropriate illumination on the area of interest.

Many applications of machine vision involve the inspection of components and surfaces for defects that affect quality. Where sufficiently serious defects are noted, a part of a surface is marked as unacceptable/defective. Machine vision has also been employed in varying degrees to assist in manipulating manufacturing engines in the performance of specific tasks.

The advent of increasingly faster and higher-performance computers, has enabled the development of machine vision systems that employ powerful search tools. In general, advanced machine vision tools acquire an image of a pattern via a camera and analyze the outline or a particular part of the pattern, such as a predetermined fiducial mark. The processing speed of the underlying computer in which the tool resides is sufficient to enable a very large number of real time calculations to be completed in a short time frame. This particularly enables the search tool to determine the coordinates within an image reference system for each analyzed point in the viewed area, and correlate these through repetition with a desired pattern. The search tool may map the locations of various points in the captured image stored points in the model image, and determine whether the captured image points fall within an acceptable range of values relative to the model image points. Using various decision algorithms, the tool decides whether the viewed pattern, in a particular rotation and scale corresponds to the desired search pattern. If so, the tool confirms that the viewed pattern is, in fact, the pattern for which the tool is searching and fixes its position and orientation. An example of such a search tool is the PatMax® product available from Cognex Corporation of Natick, Mass.

Machine vision search tools often require precise training using one or more alignment models to identify the desired patterns and/or fiducials to be identified and located during run time. Fiducials may have a large number of linear degrees of freedom, e.g., rotation, translation, etc. Fiducials may also have a varying size of the stroke width associated therewith. Typically, the machine vision system would need to be trained with a plurality of images representing each of the variations within the degrees of freedom and/or stroke widths. This may substantially increase the time required to train a machine vision system. Furthermore, by including a large number of trained images in a machine vision system, the system may require additional processing time during run time to identify fiducials. What is needed is a technique for automatic training a machine vision system to identify fiducials under large variations of linear degrees of freedom and/or stroke widths.

SUMMARY OF THE INVENTION

The present invention overcomes one or more of the disadvantages of the prior art by providing a system and method for identifying and locating instances of a shape, such as a fiducial, under large variations in linear degrees of freedom and/or stroke widths. Illustratively, the present invention first obtains an image and then performs a set of parallel processes on the obtained image. In the first branch of the parallel processes extracts boundary segments from the image and then generates potential match candidates for boundary models based on the extracted boundary segments. Concurrently, the second branch of the parallel processes extracts skeletal segments from the obtained image. Potential match candidates are then generated for skeletal models based on the extracted skeletal segments.

Once the match candidates for the boundary models and skeletal models have been generated, the process then corresponds the various boundary segments and outputs a best correspondence. The output may be utilized by a user to signify acceptance of the various correspondences located by an illustrative embodiment of the present invention. These correspondences may then be utilized to train a machine vision system.

The procedures may also be utilized during run time to identify fiducials that are known to be present but which may vary in a large number of degrees of freedom and/or stroke width.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Machine Vision System

Figure 1:
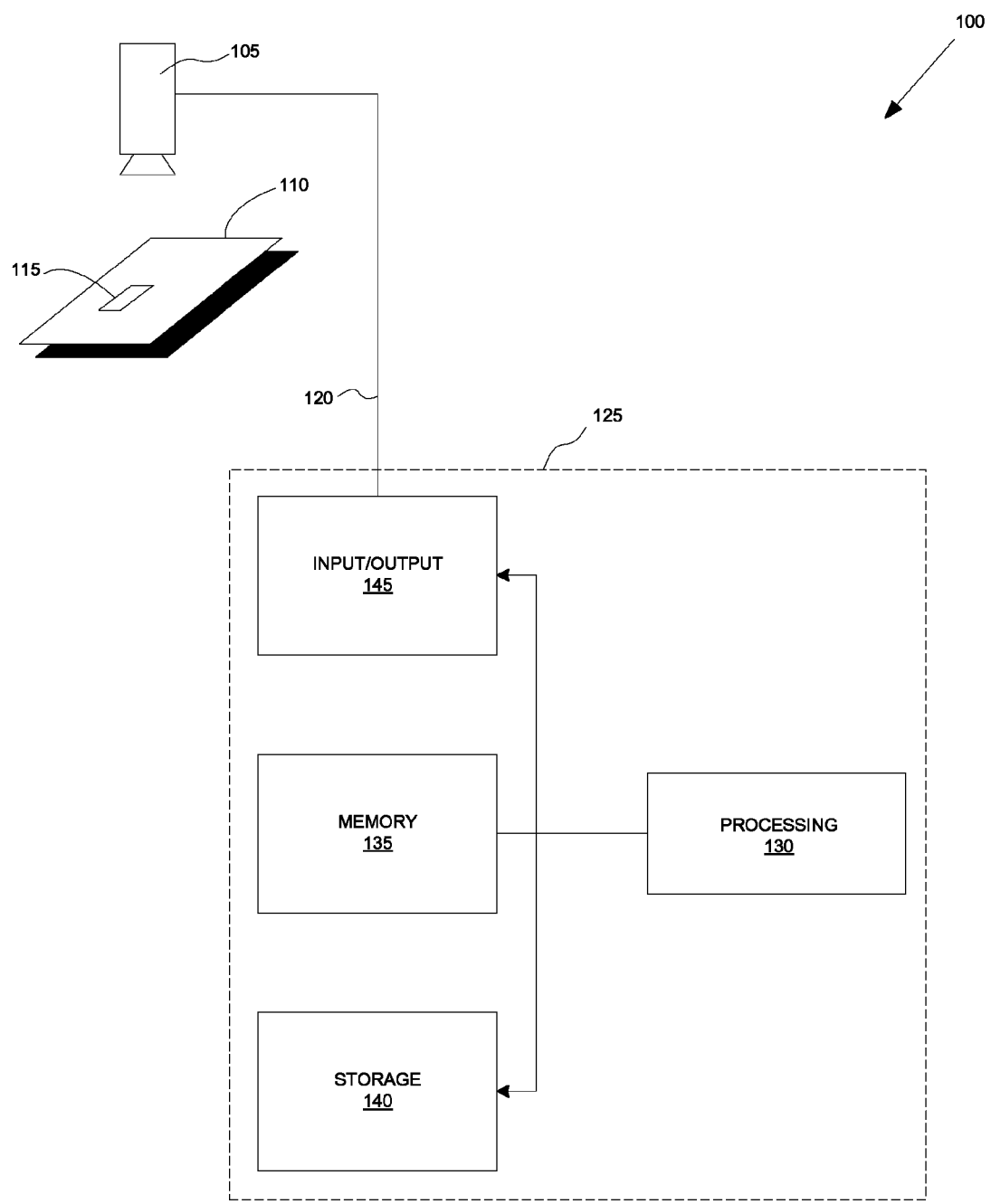
FIG. 1 is a schematic block diagram of an exemplary machine vision system for practicing the principles of the present invention in accordance with an illustrative embodiment of the present invention.

FIG. 1 is a schematic block diagram of a machine vision system 100 that may be utilized to practice the principles of the present invention in accordance with an illustrative embodiment of the present invention. The machine vision system 100 includes a capturing device 105 that generates an image of an object 110 having one or more features 115. The capturing device 105 may comprise a conventional video camera or scanner. Such a video camera may be a charge coupled device (CCD) or other system for obtaining appropriate image information. Image data (or pixels) generated by the capturing device 105 represents an image intensity, for example, color or brightness of each point in the scene within the resolution of the capturing device 105. The capturing device 105 transmits a digital image data via a communications path 120 to an image analysis system 125. The image analysis system 125 may comprise a conventional digital data processor, such as the vision processing systems of the type commercially available from, for example, Cognex Corporation.

The image analysis system 125 may be programmed in accordance with the teachings of the present invention to identify and locate instances of a shape under large variations in linear degrees of freedom. The identified and located instances of a shape may be utilized as an auto training mechanism for a machine vision system. Illustratively, the shape may comprise a fiducial marking on an object that is utilized to test for orientation, etc. However, the teachings of the present invention are not limited to fidicual identification and may be utilized to identify any shape within a image.

The image analysis system 125 may have one or more central processing units (processors) 130, main memory 135, input/output systems 145 and one or more disk drives or other form of mass storage 140. Illustratively, the input/output system 145 interconnects with the communications path 120 between the capturing device 105 and the image analysis system 125. The system 125 may be configured by programming instructions in accordance with the teachings of the present invention to perform the novel multi-image trained pattern recognition and registration of the present invention. As will be appreciated by those skilled in the art, alternative hardware and/or software configurations may be utilized to implement the principles of the present invention. Specifically, the teachings of the present invention may be implemented in software, hardware, firmware and/or any combination thereof. Furthermore, during run-time, as opposed to training time, additional components may be included in the machine vision system 100. For example, objects 115 may be transported by a conveyor belt or other assembly line apparatus, etc.

B. Feature Strokes and Stroke Widths

Figure 2A:
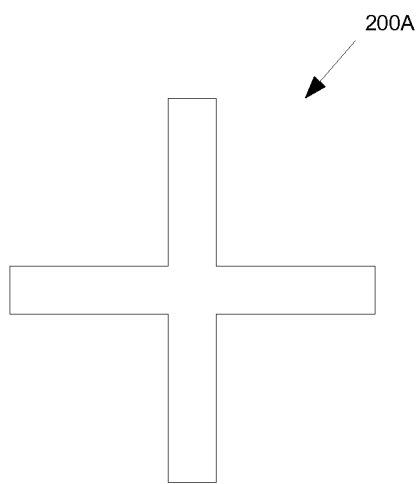
FIGS. 2A and 2B are schematic block diagrams illustrating variations in stroke width in accordance with an illustrative embodiment of the present invention.
Figure 2B:
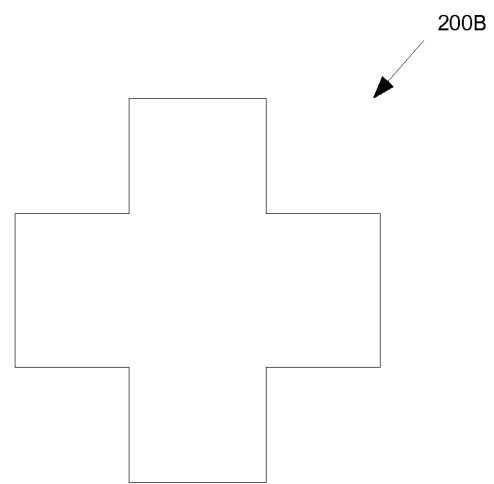

FIGS. 2A,B illustrate differences in stroke width. The present invention may be utilized to identify objects in a machine vision system that differ only in stroke width. For example, the cross 200A shown in FIG. 2A and the cross 200B shown in FIG. 2B are identically sized from an X-Y axis perspective. However cross 200B has much thicker arms, i.e., has a thicker stroke width. As noted above, conventional machine vision systems would have to be trained on a plurality of potential stroke widths, thereby substantially increasing the processing time required for training. However, the present invention enables crosses 200A, B to be quickly identified as crosses without necessitating a large number of training instantiations. More generally, the present invention enables shapes that differ only in stroke width to be identified as the shape. Thus, the present invention permits a machine vision system to have a more human like response to shape identification, e.g., by identifying both cross 200A and cross 200B are crosses, even though they have substantially differing stroke widths.

Figure 3:
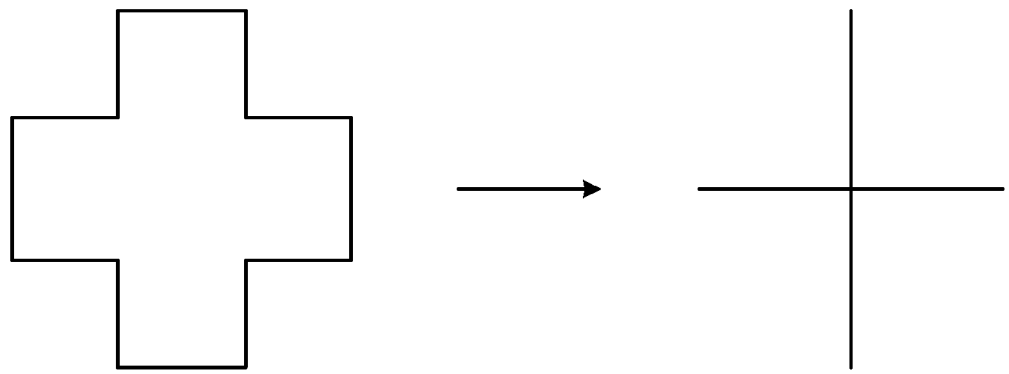
FIG. 3 is a schematic diagram illustrating the decomposition of a cross into a two stroke skeletal model in accordance with an illustrative embodiment of the present invention.
Figure 4:
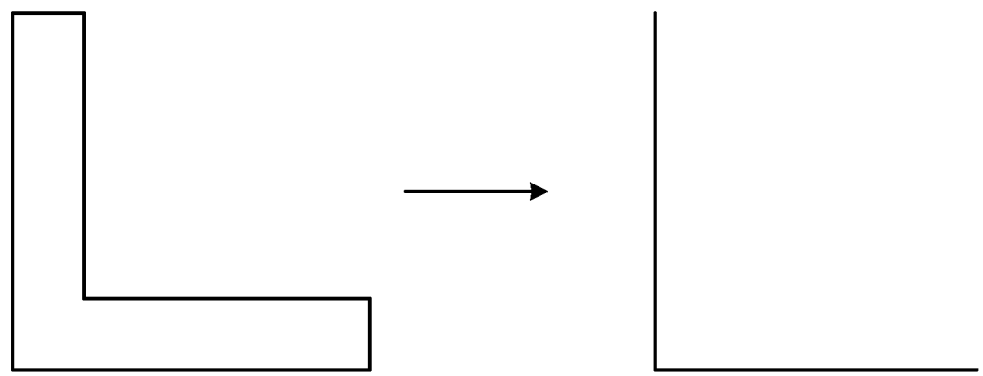
FIG. 4 is a schematic diagram illustrating the decomposition of an L into a two stroke skeletal model in accordance with an illustrative embodiment of the present invention.

Furthermore, the present invention provides a technique to efficiently find instances of trained shapes over large linear degrees of freedom and also large stroke width ranges. FIGS. 3 and 4 illustrate exemplary shapes that are generated by a discrete number of strokes. For example the cross in FIG. 3 may be skeletonized to a two stroke cross as shown. Similarly, the L shape of FIG. 4 may be skeletonized to the two stroke L as shown. The present invention utilizes skeleton based matching to enable systems to identify shapes under varying stroke widths. As these differences cannot be modeled by linear transformations, the present invention enables a machine vision system to identify these shapes without training on each possible stroke width.

C. Determining Shapes Under Large Degrees of Freedom

The present invention provides a system and method for identifying and locating instances of a shape, such as a fiducial, under large variations in linear degrees of freedom. Illustratively, the present invention first obtains an image and then performs a set of parallel processes on the obtained image. In the first branch of the parallel processes extracts boundary segments from the image and then generates potential match candidates for boundary models based on the extracted boundary segments. Concurrently, the second branch of the parallel processes extracts skeletal segments from the obtained image. Potential match candidates are then generated for skeletal models based on the extracted skeletal segments.

Once the match candidates for the boundary models and skeletal models have been generated, the present invention then corresponds the various boundary segments and outputs a best correspondence. The output from the present invention may be utilized by a user to signify acceptance of the various correspondences located by the present invention. These correspondences may then be utilized to train a machine vision system.

Figure 5:
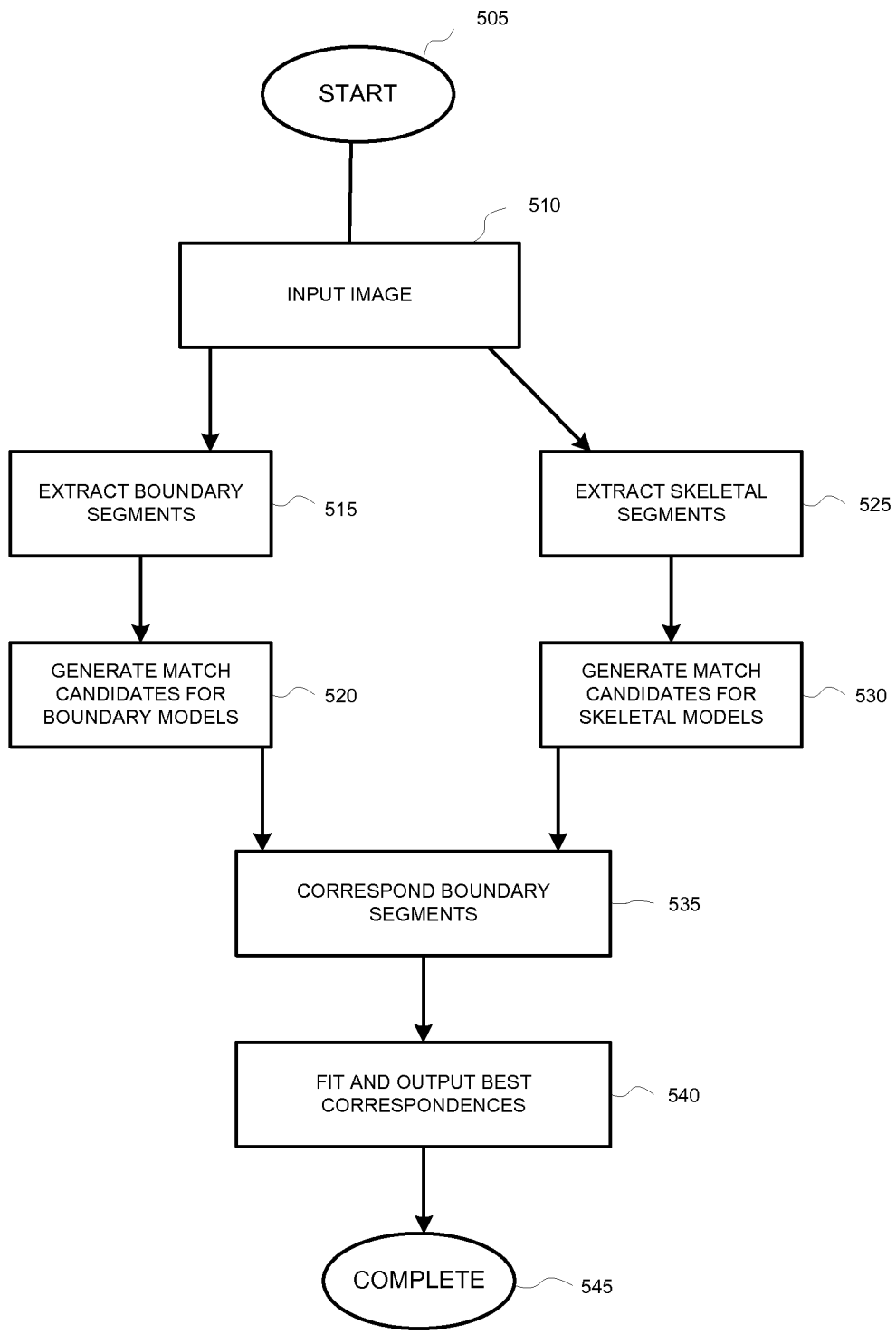
FIG. 5 is a flowchart detailing the steps of a procedure for identifying and locating a shape under large variations of linear degrees of freedom in accordance with an illustrative embodiment of the present invention.

FIG. 5 is a flowchart detailing the steps of a procedure 500 for identifying and locating instances of a shape under large variations in linear degrees of freedom in accordance with an illustrative embodiment of the present invention. The procedure 500 begins in step 505 and continues to step 510 where an image is inputted into the system. This image input may occur by, for example, an image capture device obtaining image, a stored image being replayed to the system, etc. It should be noted that any suitable technique for obtaining an image for use in a machine vision system may be utilized with the teachings of the present invention. As such, the description of an image capture device obtaining an image should be taken as exemplary only. Once the image has been inputted into the system, parallel computations occur on the image in accordance with an illustrative embodiment of the present invention. However, it should be noted that in alternative embodiments, the parallel computations described further below may occur serially. As such, the description of parallel computations should be taken as exemplary only.

The first set of parallel processes occurs in steps 515-520. In step 515 the system extracts boundary segments from the image. This may be accomplished using, e.g., conventional boundary segment acquisition techniques.

Figure 6:
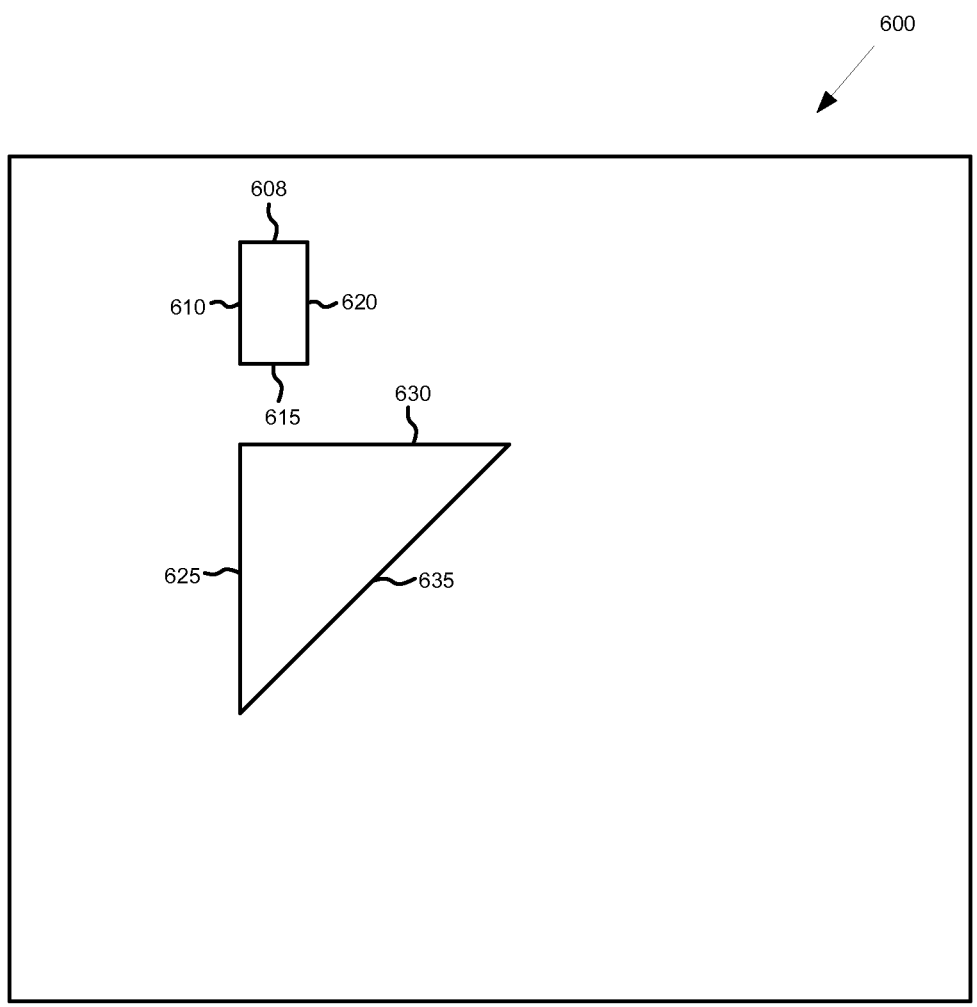
FIG. 6 is an illustration of an exemplary image containing extracted boundary segments in accordance with an illustrative embodiment of the present invention.

FIG. 6 is a schematic diagram of an exemplary image 600 showing boundary segments being extracted in accordance with an illustrative embodiment of the present invention. The illustrative image 600 includes seven boundary segments that have been identified. Boundary segments 605, 610, 615, 620 illustratively form a rectangle. Similarly, boundary segments 625, 630, 635 illustratively form a triangle. As will be appreciated by those skilled in the art, under real world conditions, boundary segments may not be in perfect alignment or may include missing portions, etc. As such, image 600 should be taken as exemplary only. In step 515, the system identifies boundary segments within the image. As noted, this may be accomplished using conventional boundary detection techniques such as, edge detection tools, etc. Illustratively, boundary segments may be identified using the RANSAC technique, described in Random Sample Consensus: A Paradigm for Model Fitting with Applications to Image Analysis and Automated Cartography, Communications of the ACM, June 1981, by M. A. Fischler and R. C. Bolles, the contents of which are hereby incorporated by reference. Alternatively, boundary segments may be identified using a three step procedure. In the first step, a Sobel edge extraction technique (or similar operation) is performed on the image to identify a plurality of edgelets. Secondly, an edgelet is selected and the procedure looks for neighboring edgelets to be utilized to build a line. Selected neighbors may be constrained by a parameter defining how much of a bend may occur locally and/or overall. Finally, once the edgelet and its neighbors have been identified, a determination is made whether the collection of edgelets is sufficiently straight to be utilized as a line segment. The process may then iterate over other edgelets to identify all possible boundary line segments in an image.

It should be noted that while the image 600 includes a total of seven boundaries, in real world environments, there may be a substantial variation in the number of boundaries identifies. Furthermore, based on the image quality, lighting, etc., there may be boundaries that do not form any shapes. For example, a shadow across the image may result in a boundary that causes a line to be across the image but does not form a shape. Similarly, should a shape not be contained within the view of the image, e.g., only half of a shape is within the image, then there may be spurious boundaries identified.

Once the boundaries have been identified, the system then, in step 520, generates match candidates for boundary models using the extracted boundary segments. This may be accomplished using line segment correspondences between a pool of standard shapes and the identified boundaries. Illustratively, this identification of match candidates functions as a coarse line segment correspondence performed for the boundary models. Illustratively, the system will include a basic pool of standard geometric models, e.g., triangles, rectangles, etc. that may be utilized. This coarse alignment may factor in, e.g., scale, rotation and/or translation to determine possible candidates.

Figure 7:
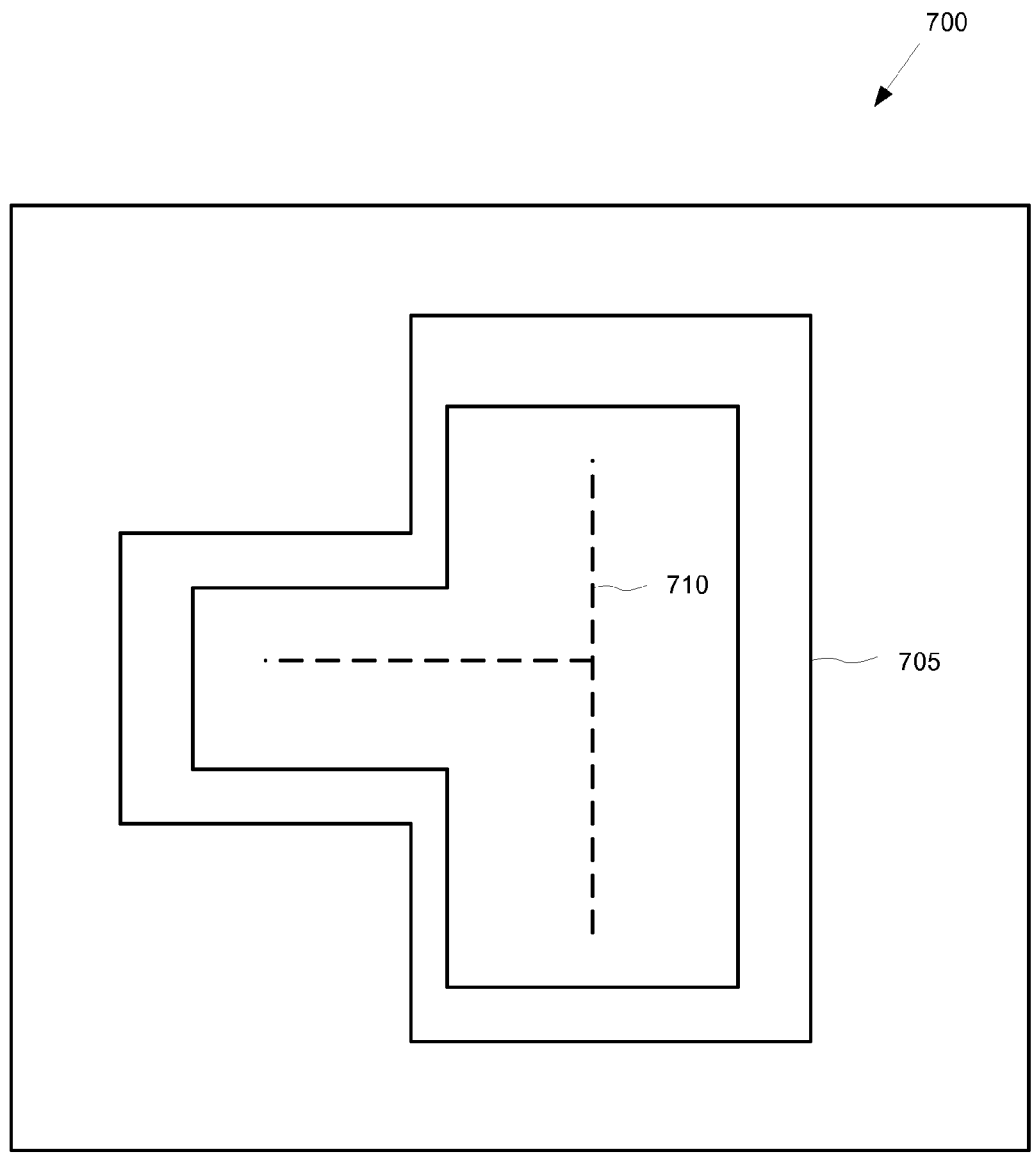
FIG. 7 is an illustration of an exemplary image containing an extracted skeletal segment in accordance with an illustrative embodiment of the present invention.

Operating in parallel to steps 515-520, the system performs steps 525 and 530. In step 525, the present invention extracts skeletal segments from the image. FIG. 7 is an exemplary image 700 showing generation of skeletal segments in accordance with an illustrative embodiment of the present invention. This image 700 includes a T 705. In accordance with the principles of the present invention the T shaped outline 705 may be skeletonized to a two stroke T 710 as shown in dashed lines.

Skeletal segments may be extracted using a variety of techniques. One illustrative technique to extract skeletal segments is described herein. However, it should be noted that alternative techniques may be utilized. As such, the technique described herein should be taken as exemplary only.

To extract skeletal segments, the image is first binarized. This may be performed by, e.g., utilizing the well-known within group variance technique to compute a threshold and then color pixels of the image as either foreground or background based on that threshold. In an alternative embodiment, a local threshold value may be utilized instead of a global threshold. This may improve the results of the binarization process. For example, a process may first perform a Sobel edge detection algorithm on an image. Each of the identified lines may then be dilated by a pixel to generate 3 pixel wide edges. As will be appreciated by one skilled in the art, the size of dilation may vary depending on implementation specifics. The thickened edges are then utilized as a mask on the original image to obtain a set of pixels that contributed to the edges. For each of the neighborhoods of the masked image, a threshold is determined based upon the pixels that contributed to the edge in each neighborhood. A regional threshold is then computed based upon the thresholds for nearby neighbors.

Once the image has been binarized, a distance transformation, as used in the well-known Watershed Transform, is performed to generate a distance transform image. More generally, for each point a distance is computed between that point and the nearest boundary between the foreground and background. The distance transform image may then be fed into a ridge following operator to result in line segments representative of the skeletal segments to be extracted.

These skeletal segments are then utilized, in step 530, to generate match candidates for skeletal models. Similar to step 520, described above, this step functions to provide a coarse correspondence including, e.g., scale, rotation and/or translation of the skeletal segments and one or more basic stroke based models, e.g., T's, L's, +'s, etc.

The output from steps 520 and 530 are then inputted to step 535 where boundary segments are corresponded. It should be noted that in alternative embodiments, steps 515, 520, 525 and 530 may be performed serially instead of in parallel. Furthermore, it should be noted that the skeletal modeling may occur before or after the boundary based modeling. As such, the description of the ordering of operations herein should be taken to be exemplary only.

The system then fits and outputs the best correspondences in step 540. Illustratively, all of the identified candidates from steps 520 and 530 are then re-evaluated to identify the best correspondences among the potential candidates. This step functions as a fine correspondence, as compared to the coarse correspondences of steps 520 and 530. Illustratively, the identification of the best correspondences utilizes a line segment correspondence technique. One technique for performing line segments correspondences is to match the end points of line segments using the well-known geometric hashing technique described in Geometric Hashing: An Overview, by Wolfson and Rigoutsos, published in 1997, which is hereby incorporated by reference. In illustrative embodiments of the present invention, differing techniques may be utilized, including the line segment correspondence technique described further below in reference to FIGS. 8 and 9.

The procedure 500 then completes in step 545. Illustratively, the best correspondences may be identified for a user to select. Those correspondences selected by a user may then form the trained model for the machine vision system. In this way, the machine vision system may be automatically trained by obtaining a sample image and identifying objects that have high correspondences based on the principles of the present invention. A user may then perform a final "quality assurance" check on the automatic training to select only those correspondences that are desired. In alternative embodiments, the procedure 500 may be utilized to find a plurality of shapes and/or a plurality of instances of a given shape at differing degree of freedom and/or stroke width values in a single image. To identify a plurality of shapes and/or a plurality of instances, the procedure 500 may output a plurality of the correspondences instead of only the best correspondences. In an illustrative embodiment, a user may select a threshold to determine a maximum number of correspondences to be returned.

D. Line Segment Correspondence

In accordance with an illustrative embodiment of the present invention, a set of identified line segments, which may be identified by locating boundary and/or skeletal segments, are corresponded to a set of model segments. While any technique for performing line segment correspondences may be utilized, as described above, one illustrative technique is described herein. It should be noted that other techniques may be utilized. As such, the description below should be taken as exemplary only.

Illustratively, the line segment correspondence technique accepts as a set of inputs, one or more models, a list of degrees of freedom and a set of identified line segments. The technique outputs a set of correspondence results comprising the model that best matches the identified line segments and a set of bi-directional correspondence.

Figure 8:
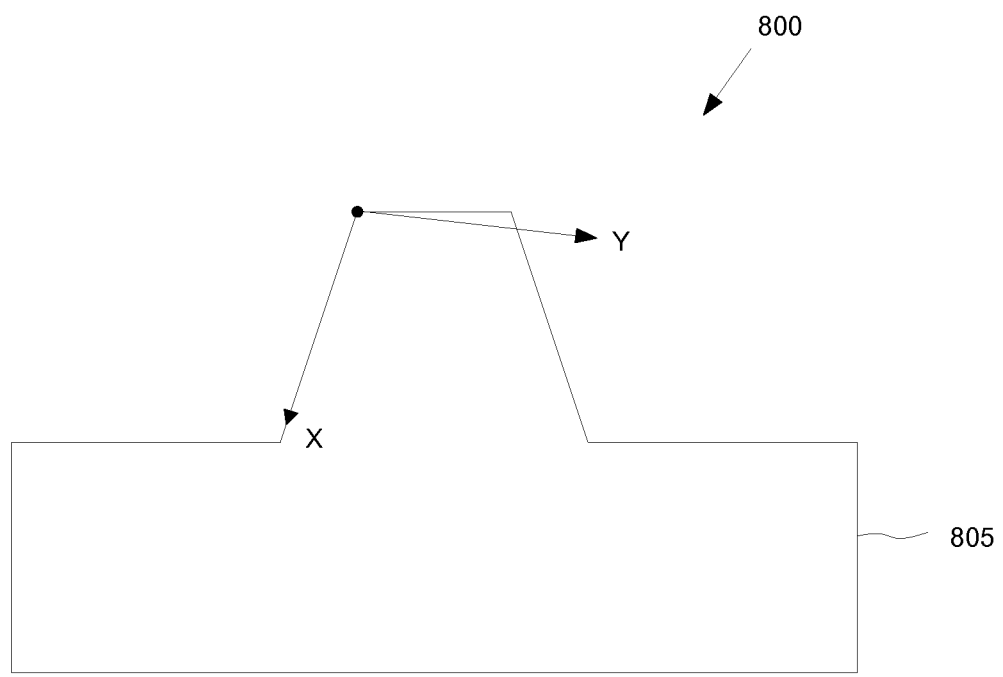
FIG. 8 is an illustration of an exemplary coordinate axis overlaid onto a shape in accordance with an illustrative embodiment of the present invention.

The models utilized for the line segment correspondence includes a model basis that consists of a single segment that defines a coordinate frame based on that segment. Illustratively, this may be performed by defining one end of the segment as the origin and having the positive X-axis point in the direction of the other endpoint. FIG. 8 is an illustration of an exemplary coordinate axis overlaid onto a shape 800 in accordance with an illustrative embodiment of the present invention. As can be seen from FIG. 8, the shaped 805 comprises a total of eight line segments. It should be noted that each segment of the model defines two bases, namely one basis in each direction. As will be appreciated by one skilled in the art, for the shape 800 shown in FIG. 8, there are a total of 16 possible bases, i.e., one basis in each direction for each of the eight line segments.

Figure 9:
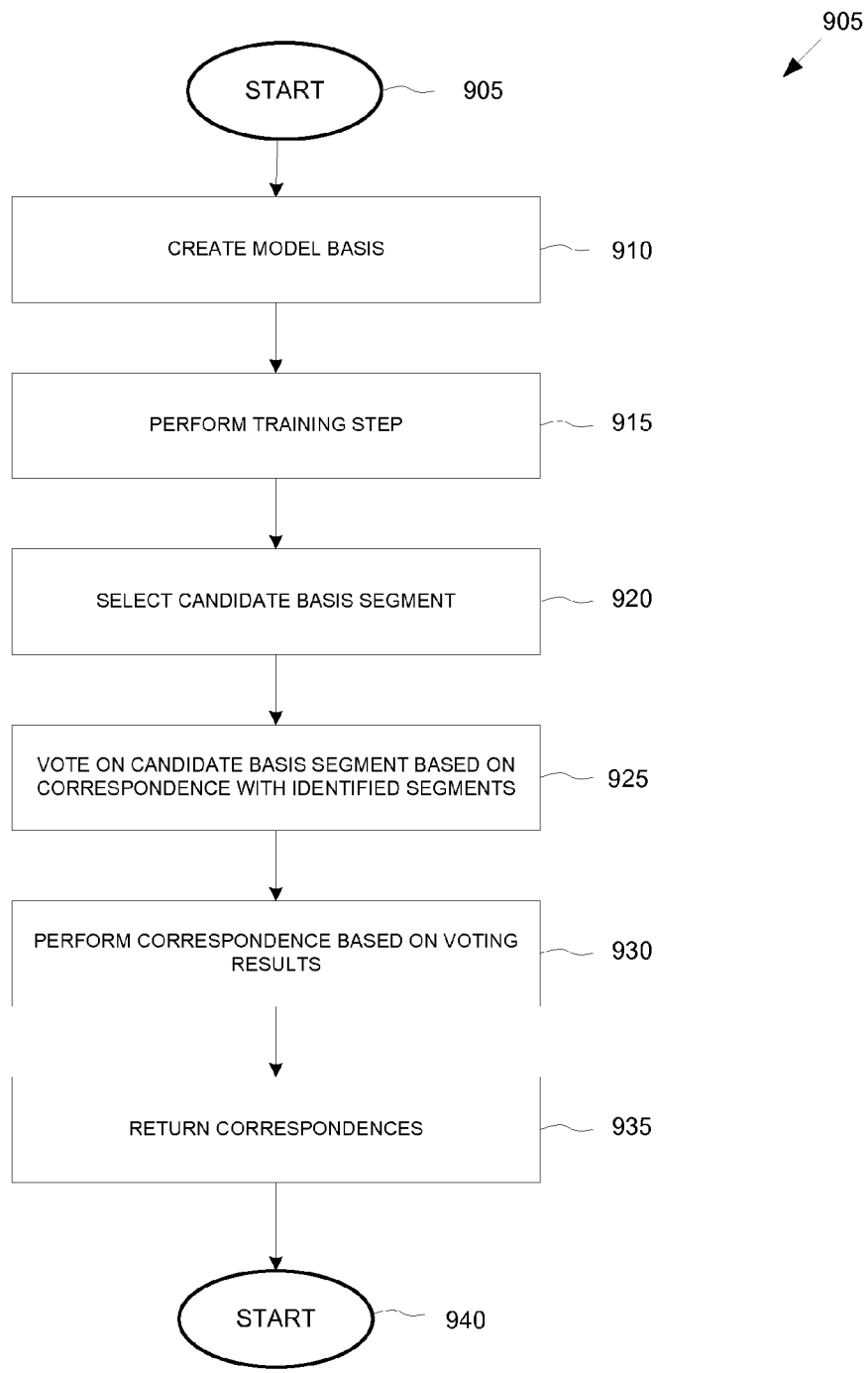
FIG. 9 is a flowchart detailing the steps of a procedure for performing line segment correspondence in accordance with an illustrative embodiment of the present invention.
Figure 10:
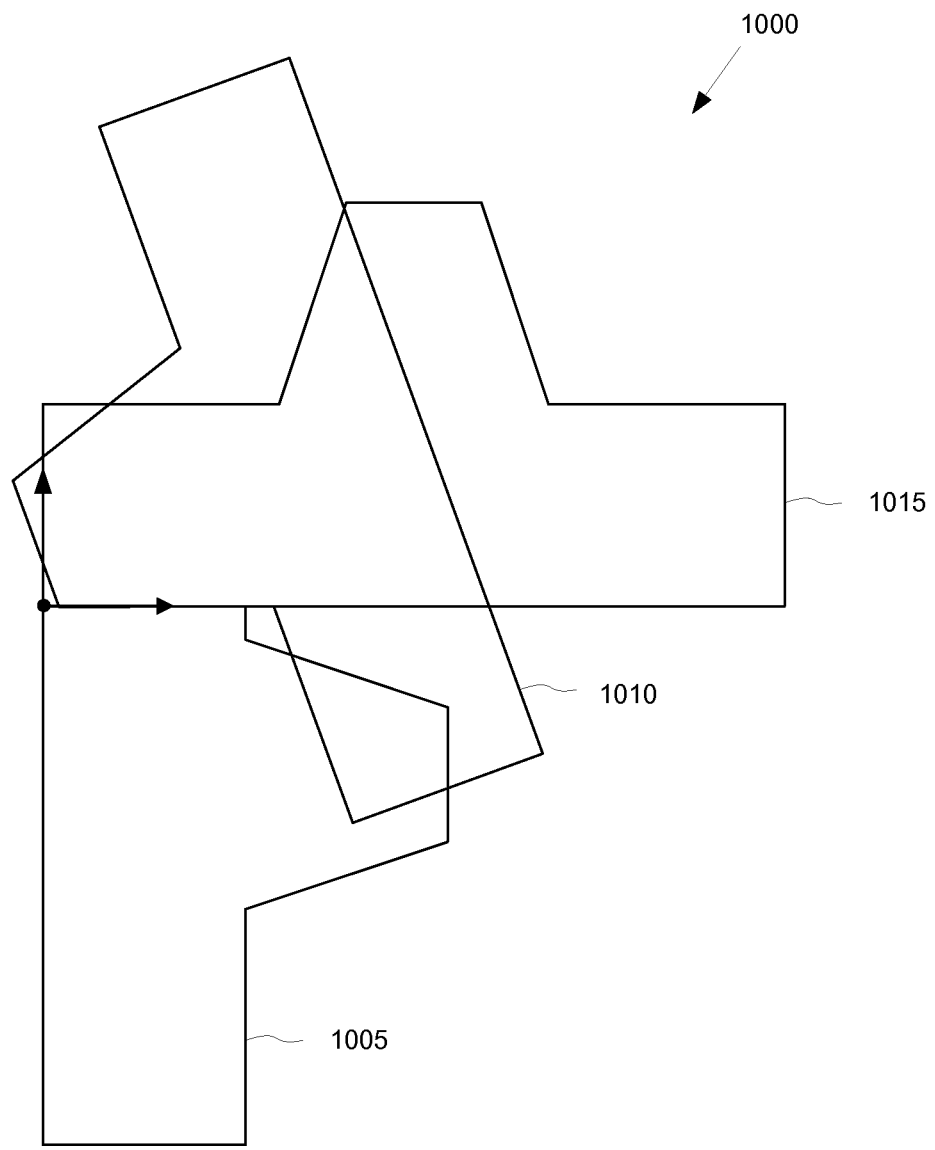
FIG. 10 is an illustration of an exemplary image in which three copies of a shape are stored in a single coordinate frame in accordance with an illustrative embodiment of the present invention.

FIG. 9 is a flowchart detailing the steps of a procedure 900 for performing line segment correspondence in accordance with an illustrative embodiment of the present invention. The procedure 900 begins in step 905 and continues to step 910 where a model basis is created. The model bases may be created by, for example, identifying all of the bases associated with a desired shape. Thus, for example, in the shape comprising eight line segments described above in relation to FIG. 8, there are a total of 16 model bases. Once the model basis has been created, a training step is then performed in step 915. Illustratively, during the training step a hash table is generated that stores a copy of the model for each possible basis. For example, FIG. 10 shows an exemplary image 1000 in which three copies of the image 1005, 1010, and 1015 are stored based off of a single coordinate frame. As noted above, the shape would have the 16 bases, two for each line segment. Only three are shown for illustrative purposes. A voting hash table is also generated during the training step 915 that is later utilized to identify found segments relative to a selected found segment and therefore identify the correspondence of that basis segment to the corresponding model segment.

Once the training step has been performed in step 915, the procedure 900 continues to step 920 during run time. In step 920 a candidate basis segment is first selected. Illustratively, the step 920 identifies a candidate basis segment from the set of identified line segments. Furthermore, a direction along the selected line segment is also selected. In certain embodiments a segment may be selected at random, however, using certain selection factors may improve the possibility of a better correspondence. Some of these factors include the magnitude of the segment, the length of the segment and its proximity to other segments that have high magnitude and/or lengths. Once the candidate basis segment has been identified, the procedure then, in step 925, votes on the candidate basis segment based on the correspondence with the identified segments. Illustratively, this may be performed attempting to correspond the selected candidate basis segment and direction with the basis models.

Each time there is an appropriate correspondence between an identified line segment and the basis model, the combination gets an increased score. After attempting to fit all of the identified segments, the combinations of the model, basis and direction that have the highest scores are then identified as possible matches. If there are no strong matches, it is possible that the selected candidate basis does not form part of an object. In such a case, the procedure may loop back to step 920 and select an alternate candidate basis segment. At the conclusion of step 925, a coarse pose has been generated based off of the basis model to which was corresponded the identified line segments. However, to perform a better fit and to generate a full correspondence, the procedure 900 then proceeds to step 930 and performs a correspondence based on the voting results. Illustratively, this may be performed by transforming each identified segment to its approximate location based upon the model. Once the final correspondence has been performed, a list of correspondences may be returned in step 935. The procedure 900 then completes in step 940.

Illustratively, the procedure also determines a best pose (or fit) for the model to the identified segments. This pose is utilized to determine how good of a correspondence exists between the model and the identified segments. This pose may be determined by, e.g., performing a point to point match, a point to line match or a line to line match between the identified segments and the model. Illustratively, a point to line match is utilized wherein the endpoints of the identified segments are matched to a line of the model. A conventional least squares fit may then be utilized to identify the best pose between the model and the identified segments. In an alternative embodiment, the midpoint of the line of the model may receive a nominal weighting value to avoid cases of the pose being underconstrained.

To again summarize, the present invention is directed to a system and method for identifying and locating a shape under large variations of linear degrees of freedom. The principles of the present invention may be utilized to automatically train a machine vision system without requiring a user to perform a plurality of training operations based on an image or shape and variations of degrees of freedom. Furthermore, the present invention may be utilized to quickly identify shapes in an image that correspond to a small library of geometric shapes. The present invention operates by first obtaining image and extracting a set of boundary and skeletal segments from the image. Utilizing the boundary and skeletal segments a set of potential match candidates are generated based on a set of boundary and skeletal models. The identified potential match candidates are then corresponded by utilizing a line correspondence technique and generate a final list of correspondences. The final set of correspondences may then be output to a user to identify which correspondences to utilize in future machine vision applications.

The foregoing description has been directed to particular embodiments of this invention. It will be apparent, however, that other variations and modifications may be made to the described embodiments, with the attainment of some or all of their advantages. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for automatically training a machine vision system prior to run-time of an industrial automation system that utilizes the machine vision system, the machine vision system comprising a digital data processor, the method comprising the steps of:
    a) receiving at the digital data processor an image of an object worked upon in the industrial automation system, the image comprising a plurality of edges;
    b) extracting, using the digital data processor, a set of boundary line segments from the image that coincide with at least one of the plurality of edges;
    c) generating, using the digital data processor, one or more boundary match candidates by selecting at least one boundary model shape from a library of predefined boundary model shapes and comparing the at least one boundary model shape to the set of extracted boundary segments;
    d) extracting, using the digital data processor, a set of internal line segments from the image that are remote from the plurality of edges; wherein a boundary of the object is skeletonized to create the set of internal line segments;
    e) generating, using the digital data processor, one or more internal match candidates by selecting at least one internal line model shape from a library of predefined internal line model shapes and comparing the at least one internal line model shape to the set of extracted internal line segments;
    f) corresponding, using the digital data processor, the set of boundary line segments to the one or more boundary match candidates and the set of internal line segments to the one or more internal match candidates to identify a set of best correspondences for the object; and
    g) prior to run-time of the industrial automation system, automatically training the machine vision system for using one or more of the set of best correspondences for the object.

2. The method of claim 1 wherein step d) further comprises identifying a stroke width associated with the object within the image.

3. The method of claim 1, the method further comprising:
h) outputting the set of best correspondences.

4. The method of claim 1 wherein the object has the shape of a cross.

5. The method of claim 1 wherein the object has the shape of a T.

6. The method of claim 1 wherein the object has the shape of an L.

7. The method of claim 1 wherein the object has the shape of a rectangle.

8. The method of claim 1 wherein the library of predefined boundary model shapes and the library of predefined internal line model shapes comprise a single library of predefined shapes.

9. A system for automatically training a machine vision system prior to run-time of an industrial automation system that utilizes the machine vision system, the system comprising:
    means for obtaining an image of an object worked upon in the industrial automation system, the image comprising a plurality of edges;
    means for extracting a set of boundary line segments from the image that coincide with at least one of the plurality of edges;
    means for generating one or more boundary match candidates by selecting at least one boundary model shape from a library of predefined boundary model shapes and comparing the at least one boundary model shape to the extracted set of boundary segments;
    means for extracting a set of internal line segments from the image that are remote from the plurality of edges; wherein a boundary of the object is skeletonized to create the set of internal line segments;
    means for generating one or more internal match candidates by selecting at least one line model shape from a library of predefined line model shapes and comparing the at least one line model shape to the extracted set of line segments;
    means for corresponding the set of boundary line segments to the one or more boundary match candidates and the set of internal line segments to the one or more internal match candidates to identify a set of best correspondences for the object;
    and means for automatically training the machine vision system prior to run-time of the industrial automation system, the training for using one or more of the set of best correspondences for the object.

10. A method for automatically training a machine vision system prior to run-time of an industrial automation system that utilizes the machine vision system, the machine vision system comprising a digital data processor, the method comprising the steps of:
    a) receiving at the digital data processor an image of an object worked upon in the industrial automation system, the image comprising a plurality of edges;
    b) extracting, using the digital data processor, a set of boundary line segments and a set of internal line segments from the image, the set of boundary line segments coincide with at least one of the plurality of edges, the set of internal line segments are remote from the plurality of edges; wherein a boundary of the object is skeletonized to create the set of internal line segments;
    c) comparing, using the digital data processor, at least one of the set of boundary line segments to at least one predefined shape in a library of shapes;
    d) comparing, using the digital data processor, at least one of the set of internal line segments to at least one predefined shape in the library of shapes;
    e) generating, using the digital data processor, one or more match candidates based on the of steps c) and d);

f) corresponding, using the digital data processor, the set of boundary line segments and the set of internal line segments to the one or more match candidates to identify a set of best correspondences for the object; and g) prior to run-time of the industrial automation system, automatically training the machine vision system for using one or more of the set of best correspondences for the object.

11. The method of claim 10 further including, during run-time of the industrial automation system, locating a shape on the object using the trained machine vision system.

12. The method of claim 11 wherein the step of locating the shape on the object includes locating the shape on the object while the object is moving on an assembly line in the industrial automation system.

13. The method of claim 11 wherein the step of obtaining the image of the object includes obtaining the image of the object while the object is not moving on an assembly line in the industrial automation system.

14. A method for locating a shape on an object after training a machine vision system to locate the shape, the machine vision system to be used in an industrial automation run-time application, the object to be worked upon in the industrial automation run-time application, the method comprising:

during the machine vision training time performing the steps of:

i) capturing an image of a model object comprising the shape, the image comprising a plurality of edges;

ii) transmitting the image to an image analysis system, the image analysis system performing the steps of:

a) extracting a set of boundary line segments and a set of internal line segments from the image, the set of boundary line segments coinciding with at least one of the plurality of edges, the set of internal line segments are remote from the plurality of edges; wherein a boundary of the object is skeletonized to create the set of internal line segments;

b) comparing the set of boundary line segments to at least one predefined shape in a library of shapes;

c) comparing the set of internal line segments to at least one predefined shape in the library of shapes;

d) generating one or more match candidates based on the comparing of steps b) and c);

e) corresponding the set of boundary line segments or the set of internal line segments to identify a set of best correspondences that identify the shape on the model object; and f) automatically training the machine vision system for using at least one of the set of best correspondences to locate the shape on the object; and after training the machine vision system, performing the steps of:

iii) capturing an image of the object; and iv) using the industrial automation run-time application to locate the shape on the object.

15. The method of claim 14 wherein the step of capturing the image of the object includes capturing the image of the object while the object is not moving on an assembly line in an industrial automation system.

16. The method of claim 14 wherein the step of using the industrial automation run-time application includes locating the shape on the object while the object is moving on an assembly line in an industrial automation system.

* * * * *